United States Patent [19]
Allis et al.

[11] Patent Number: 5,137,227
[45] Date of Patent: Aug. 11, 1992

[54] FISHING REEL WITH SNAP-FIT REEL BODY

[75] Inventors: David Allis, Tulsa; Thomas A. Pulliam, Broken Arrow, both of Okla.

[73] Assignee: Zebco Corporation, Tulsa, Okla.

[21] Appl. No.: 603,960

[22] Filed: Oct. 23, 1990

[51] Int. Cl.$^5$ ............................................. A01K 89/01
[52] U.S. Cl. .................................... 242/311; 242/312
[58] Field of Search ............... 242/234, 235, 236, 237, 242/238, 239, 240, 310, 311, 312, 314, 315, 319

[56] References Cited

U.S. PATENT DOCUMENTS

| | | | |
|---|---|---|---|
| 2,746,695 | 5/1956 | Clay | 242/311 X |
| 3,057,575 | 10/1962 | Hull | 242/311 |
| 3,105,651 | 10/1963 | Hull | 242/311 |
| 3,142,454 | 7/1964 | Hull | 242/311 X |
| 3,152,771 | 10/1964 | Maury et al. | 242/311 X |
| 3,296,731 | 1/1967 | Wood | 242/316 X |
| 3,473,753 | 10/1969 | Hull | 242/311 |
| 3,481,554 | 12/1969 | Hull | 242/311 X |
| 3,970,263 | 7/1976 | Hull | 242/311 |
| 4,154,413 | 5/1979 | Hull | 242/311 |
| 4,331,303 | 5/1982 | Moss | 242/311 |
| 4,637,569 | 1/1987 | Swisher | 242/239 |
| 4,997,143 | 3/1991 | Grice | 242/311 |

Primary Examiner—Daniel P. Stodola
Assistant Examiner—John F. Rollins
Attorney, Agent, or Firm—Wood, Phillips, VanSanten, Hoffman & Ertel

[57] ABSTRACT

A fishing reel having a reel body, a rear cover defining a receptacle for the reel body, a front cover, structure for releasably connecting the front and rear covers for maintaining the reel body captively within the rear cover receptacle, and structure for releasably connecting the reel body to one of the front and rear covers.

14 Claims, 1 Drawing Sheet

U.S. Patent  Aug. 11, 1992  5,137,227
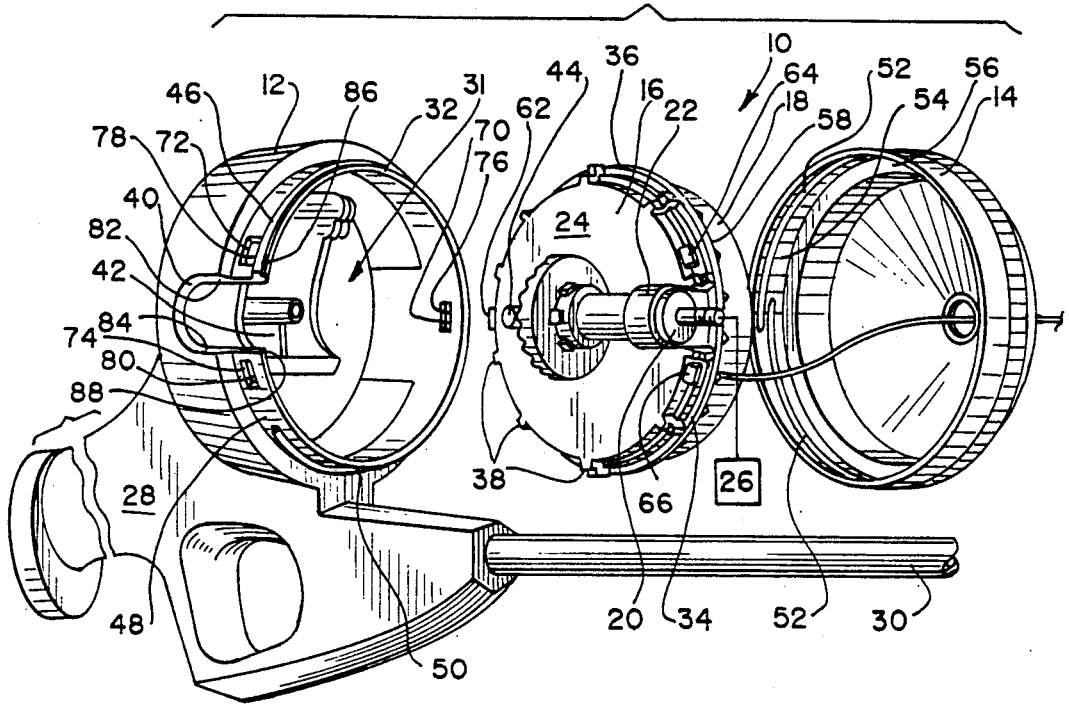
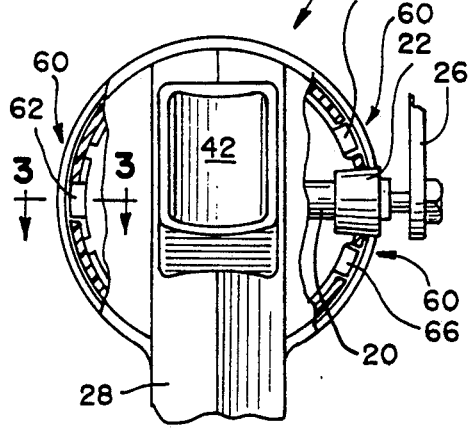
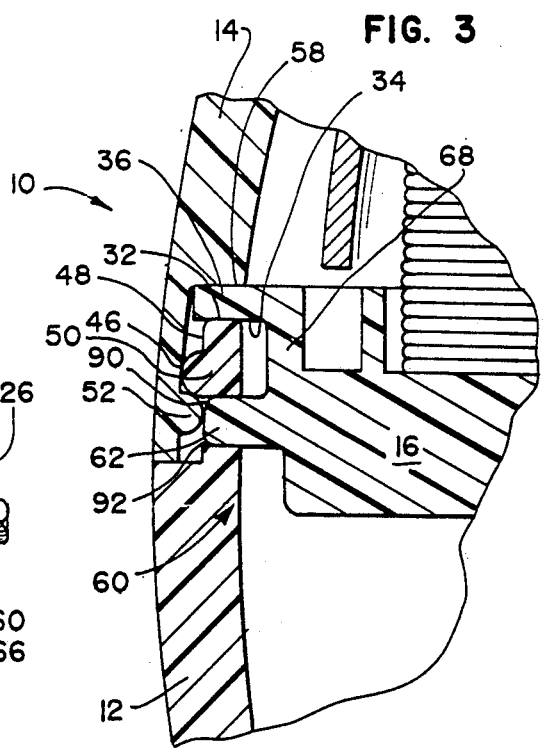

FISHING REEL WITH SNAP-FIT REEL BODY

BACKGROUND OF THE INVENTION

1. Field of the Invention

This invention relates to fishing reels of the type having a body maintained in operative position between two cover parts and, more particularly, to a structure for releasably connecting the reel body to one of the cover parts to prevent the reel body from inadvertently falling out upon separation of the reel cover parts, one from the other.

2. Background Art

It is known to construct fishing reels with joinable cover parts which cooperatively maintain a reel body, on which at least part of the operating mechanism for the reel is mounted, captively in an operative position. In an exemplary spin cast arrangement, a rear cover defines a receptacle for the reel body. With the reel body in place in the rear cover receptacle, the front cover attaches to the rear cover and captively maintains the reel body in place.

Reels constructed in the above manner have several advantages. First of all, manufacturing and assembly of the reel are facilitated, as is maintenance of the reel. To gain access to the operating mechanism for the reel, the user need only remove the front cover and separate the reel body from the rear cover to work on the same. The front cover is responsible for holding and releasing the reel body.

Exemplary prior art spin cast structures are shown in U.S. Pat. Nos. 3,041,002; 3,416,746; and 3,900,167, all to Hull. Each of these reels employs a screw to hold front and rear reel covers together and at the same time maintain a reel body therewithin in operative position. Removal of the screw(s) allows the reel cover parts and reel body to be separated from each other.

The one drawback with the above-type construction is that the reel body may inadvertently fall out of the reel upon separation of the cover parts. While this is not a particularly troublesome problem on land, when one effects repairs on a lake, the reel body may be dropped into the water and lost.

At the same time, during assembly, one must keep the reel body in proper orientation in the receptacle on the rear cover before assembling the front cover. This may require tipping the rear cover upwardly so that the reel body nests in its proper orientation before the front cover is attached.

SUMMARY OF THE INVENTION

The present invention is specifically directed to overcoming the above-enumerated problems in a novel and simple manner.

The present invention is a fishing reel having a reel body, a rear cover defining a receptacle for the reel body, a front cover, structure for releasably connecting the front and rear covers for maintaining the reel body captively within the rear cover receptacle, and structure for releasably connecting the reel body to one of the front and rear covers.

With the above structure, the front and rear covers can be separated from each other, whereupon the reel body remains connected to the one of the front and rear covers to thereby prevent inadvertent falling out and loss of the reel body upon the front and rear covers being separated from each other.

Preferably the structure for releasably connecting the reel body is a snap connecting structure so that assembly and disassembly of the reel body can be simply accomplished.

In a preferred form, the connecting structure for the reel body consists of a tab on one of the reel body and one of the front and rear covers and a shoulder on the other of the reel body and the one of the front and rear covers. At least one of the tab and the other of the reel body and the one of the front and rear covers is deformable to facilitate connection and disassembly of the reel body and the one of the front and rear covers.

Normally, the reel body is releasably connected to the rear cover. The rear cover has a cut-out to accommodate a crank boss on the reel body. The cut-out defines facing, circumferentially spaced edges on the rear cover. In a preferred form, at least one of the tabs/shoulders is on the rear cover adjacent to the front of the rear cover and one of the circumferentially spaced edges. The rear cover effectively defines flaps at the juncture of the circumferentially spaced edges and the front edge of the rear cover. These flaps are readily deformable to allow a tab to be placed operatively behind the shoulder. Preferably, there is a cooperating tab and shoulder arrangement adjacent each circumferentially spaced edge at the front of the rear cover.

In a preferred form, there is, in addition to the tab and shoulder arrangements adjacent the circumferentially spaced edges, a cooperating tab and shoulder at a location diametrically opposite the cut-out. This allows the user to cant the reel body, place the tab against the shoulder opposite the cut-out and then tilt the reel body back in to engage the other tabs and shoulders.

The shoulders can be defined by indents or cut-outs entirely through the member on which they are defined.

In a preferred form, the reel body has an annular wall with a radially outwardly facing surface and the tabs project radially outwardly from that wall. The shoulders can be provided adjacent to a flexible, forward, annular edge on the rear cover.

In one form of the reel, the reel body has a radially projecting, annular bead defining a rearwardly facing shoulder and the rear cover has a front edge against which the rearwardly facing shoulder on the reel body abuts with the reel body in an assembled position within the rear cover receptacle.

BRIEF DESCRIPTION OF THE DRAWINGS

FIG. 1 is an exploded perspective view of a fishing reel with structure for releasably connecting the reel body to a cover part according to the present invention;

FIG. 2 is a rear elevation view of the fishing reel in FIG. 1 partially broken away to expose the inventive reel body connecting structure;

FIG. 3 is an enlarged cross-sectional view of the inventive reel body connecting structure taken along line 3—3 of FIG. 2;

DETAILED DESCRIPTION OF THE DRAWINGS

A preferred form of fishing reel, according to the present invention, is shown in FIGS. 1-3 at 10. The fishing reel 10 consists of a rear cover 12, a front cover 14 and a reel body 16. The reel body 16 carries the operating mechanism for the fishing reel 10. The present invention is not directed to the details of the operating mechanism and, consequently, detailed description thereof is omitted herefrom.

Briefly, the reel operating mechanism consists of a rotatable spinner head 18, which is operated by a crank shaft 20, journalled for rotation within a crank boss 22, integrally formed with a deck plate 24 on the reel body 16. The crank shaft 20 is operated externally of the reel by a crank handle 26, shown schematically in FIG. 1.

In the illustrated embodiment, the fishing reel 10 is shown to be integral with a rod handle 28 having an associated rod 30. It should be understood that the invention contemplates a fishing reel that is entirely separable from the rod and rod handle combination. The one-piece construction for the handle 28 and rear cover 12 is but exemplary of one style of fishing reel into which the present invention can be incorporated.

The rear cover 12 has a forwardly opening cup shape defining a receptacle 31 for the reel body 16. The rear cover 12 has an annular, forwardly facing front edge 32 which abuts a rearwardly facing, annular shoulder 34, defined on a radially enlarged bead 36 on the reel body 16, to limit rearward movement of the reel body 16 into the receptacle 30 in the rear cover 12. A plurality of circumferentially spaced locating ribs 38 on the reel body 16 keep the reel body 16 centered within the receptacle 30.

The rear cover 12 has a forwardly opening, U-shaped cut-out 40 to accommodate the crank boss 22, which has a matched configuration, to allow full seating of the reel body 16 in the receptacle 30. With the reel body 16 fully seated in the receptacle 30, a pivotable thumb button 42 on the rear cover 12 is aligned to engage a center shaft 44 carried by the spinner head 18. With the reel body 16 in place on the rear cover 12, the front cover 14 can be attached to the rear cover 12. This is accomplished by providing threads 46 on the outer surface 48 of a reduced thickness rim 50 on the rear cover 12 and mating threads 52 on the inside surface 54 of the front cover 14. Threaded attachment of the front cover 14 to the rear cover 12 draws an annular shoulder 56 on the front cover 14 against a facing, annular shoulder 58 on the bead 36 and thereby captively maintains the bead 36 against the front edge 32 of the rear cover 12.

The present invention is directed to means at 60 for releasably connecting the reel body 16 to the rear cover 12. It should be understood that the connecting means 60 could be used in similar fashion to connect the reel body 16 to the front cover 14.

More specifically, the means 60 for releasably connecting the reel body 16 to the rear cover 12 consists of a plurality of tabs 62, 64, 66 projecting radially outwardly from an annular wall 68 on the reel body 16, which tabs 62, 64, 66 are received in cut-outs 70, 72, 74 through the rim 50. Each cut-out 70, 72, 74 defines a rearwardly facing shoulder 76, 78, 80, respectively which, with the tabs 62, 64, 66 in the cut-outs 70, 72, 74, interfere with the tabs 62, 64, 66 to prevent separation of the reel body 16 from the rear cover 12.

It should be understood that it is not necessary to provide cut-outs entirely through the rim 50, as slight indents/recesses defining shoulders would suffice. It should further be understood that the described arrangement of three tabs/recesses 62/70, 64/72, 66/74, while a preferred number and arrangement, is not to be viewed as limiting.

The rear cover cut-out 40 defines circumferentially spaced, facing edges 82, 84 adjacent to which the cut-outs 72, 74 are provided. The cut-out 40 effectively defines flexible flaps 86, 88 which are sufficiently flexible to facilitate entry of the tabs 64, 66 into the cut-outs 72, 74, respectively.

To effect assembly, the tab 62, which is substantially diametrically opposite to the pair of tabs 64, 66, is directed into the cut-out 70 with the reel body 16 canted in the FIG. 1 orientation. Once the tab 62 is within the cut-out 70, the opposite end of the reel body can be shifted rearwardly. The tabs 64, 66 then engage the rim 50. By applying rearward pressure on the reel body 16, the tabs 64, 66 progressively deflect the flaps 86, 88, respectively, radially outwardly sufficiently to allow passage of the tabs 64, 66 into the cut-outs 72, 74. Once the tabs 64, 66 align with the cut-outs 72, 74, the flaps 86, 88 spring back to place the tabs 64, 66 rearwardly of and in abutting relationship with the shoulders 78, 80. To withdraw the reel body, forward pressure is applied thereon to unseat the tabs 62, 64, 66. The rim 50 also deforms in the vicinity of the cut-out 70 to allow placement of the tab 62 into the cut-out 70 and withdrawal of the tab 62 therefrom.

With the above described arrangement, it is also possible to effect assembly and disassembly of the reel body by axially aligning the rear cover 12 and reel body 16 and applying straight axial pressure thereon to urge the reel body 16 and rear cover 12 against each other. The tabs 62, 64, 66 can also be made flexible to facilitate assembly and disassembly of the reel body 16. As shown in FIG. 3, using exemplary tab 62, the tab 62 has rounded edges 90, 92 to produce a camming action as the reel body 16 is placed into and removed from its operative position.

It can be seen that the tabs 62, 64, 66 and cooperating shoulders 76, 78, 80 releasably connect the reel body 16 to the rear cover 12. Upon removal of the front cover 14, the reel body 16 remains connected to the rear cover 12 so that inadvertent separation of the reel body 16 from the rear cover 12 is avoided. Assembly is facilitated by reason of the inventive connecting means which allows the reel body 16 to be snap-fit to the rear cover 12 and easily withdrawn therefrom.

The foregoing disclosure of specific embodiments is intended to be illustrative of the broad concepts comprehended by the invention.

We claim:

1. A fishing reel comprising:
   a reel body;
   a rear cover defining a receptacle for the reel body;
   a front cover;
   means releasably connecting the front and rear covers for maintaining the reel body captively within the rear cover receptacle; and
   means for releasably connecting the reel body to one of the front and rear covers,
   whereby with the front and rear covers separated from each other the reel body remains connected to the one of the front and rear covers to thereby prevent inadvertent falling out and loss of the reel body upon the front and rear covers being separated from each other,
   wherein the means for releasably connecting the reel body comprises means for snap connecting the reel body to one of the front and rear covers.

2. A fishing reel comprising:
   a reel body;
   a rear cover defining a receptacle for the reel body;
   a front cover;

means releasably connecting the front and rear covers for maintaining the reel body captively within the rear cover receptacle; and means for releasably connecting the reel body to one of the front and rear covers, whereby with the front and rear covers separated from each other the reel body remains connected to the one of the front and rear covers to thereby prevent inadvertent falling out and loss of the reel body upon the front and rear covers being separated from each other, wherein the means for releasably connecting the reel body comprises a tab on one of the reel body and the one of the front and rear covers and a shoulder on the other of the reel body and the one of the front and rear covers.

3. The fishing reel according to claim 2 wherein at least one of the tab and the shoulder on the other of the reel body and the one of the front and rear covers is deformable to facilitate connection and disconnection of the reel body and the one of the front and rear covers.

4. The fishing reel according to claim 3 wherein the means for releasably connecting the reel body connects the reel body to the rear cover.

5. The fishing reel according to claim 4 wherein the reel body has a crank boss, the rear cover has a front and rear and a cutout to accommodate the crank boss with said cutout defining circumferentially spaced edges on the rear cover, and one of the tab and shoulder is on the rear cover adjacent to the front of the rear cover and one of the circumferentially spaced edges.

6. The fishing reel according to claim 5 wherein there is a tab/shoulder on the rear cover adjacent the front of the rear cover and each circumferentially spaced edge and cooperating shoulder/tabs on the reel body.

7. The fishing reel according to claim 6 wherein the front portion of the rear cover is substantially circular and there is a tab/shoulder on the rear cover at a location substantially diametrically opposite to the cutout and a cooperating shoulder/tab on the front cover.

8. The fishing reel according to claim 2 wherein the reel body includes a deck plate with an annular wall having a radially outwardly facing surface and the tab projects radially outwardly from the annular wall.

9. The fishing reel according to claim 2 wherein the rear cover has a forward flexible annular edge on which the tab/shoulder is located.

10. The fishing reel according to claim 9 wherein the edge is non-continuous to facilitate flexing thereof and placement of the tab in a blocking position with respect to the shoulder.

11. The fishing reel according to claim 2 wherein the shoulder is defined by a cutout through one of the reel body and the one of the front and rear covers.

12. A fishing reel comprising:
a reel body;
a rear cover defining a forwardly opening cup-shaped receptacle for the reel body;
a front cover;
means releasably connecting the front and rear covers for maintaining the reel body captively within the rear cover receptacle; and
means for releasably connecting the reel body to one of the front and rear covers.
whereby with the front and rear covers separated from each other the reel body remains connected to the one of the front and rear covers to thereby prevent inadvertent falling out and loss of the reel body upon the front and rear covers being separated from each other.
wherein the reel body has a radially projecting, annular bead defining a rearwardly facing shoulder and the rear cover has a front edge against which the rearwardly facing shoulder on the reel body abuts with the front edge in an assembled position within the rear cover receptacle.
wherein the means for releasably connecting the reel body releasably connects the reel body to the rear cover and comprises a tab on one of the reel body and the rear cover and a second shoulder on the other of the reel body and rear cover.

13. The fishing reel according to claim 12 wherein the rear cover has a cutout defining the second shoulder which faces in a rearward direction and which is blocked by the tab with the reel body in its assembled position.

14. The fishing reel according to claim 12 wherein the means for releasably connecting the reel body comprises a plurality of cooperating tabs and shoulders on the reel body and rear cover.

* * * * *